United States Patent
Schillings (10) Patent No.: US 10,134,116 B2
(45) Date of Patent: Nov. 20, 2018

(54) DEBLURRING IMAGES ACCORDING TO A USER'S EYESIGHT

(71) Applicant: FACEBOOK, INC., Menlo Park, CA (US)

(72) Inventor: Benoit M. Schillings, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/647,130

(22) Filed: Oct. 8, 2012

(65) Prior Publication Data
US 2014/0098121 A1 Apr. 10, 2014

(51) Int. Cl.
*G06T 5/00* (2006.01)

(52) U.S. Cl.
CPC ..... *G06T 5/003* (2013.01); *G09G 2320/0261* (2013.01)

(58) Field of Classification Search
None
See application file for complete search history.

(56) References Cited

U.S. PATENT DOCUMENTS

| | | | |
|---|---|---|---|
| 2010/0054584 A1* | 3/2010 | Schadt et al. | 382/164 |
| 2011/0317023 A1* | 12/2011 | Tsuda | H04R 1/406 348/207.99 |
| 2014/0348441 A1* | 11/2014 | Tezaur | 382/255 |

OTHER PUBLICATIONS

Alonso, Miguel, Jr. et al, "HOWARD: High-Order Wavefront Aberration Regularized Deconvolution for enhancing graphic displays for visually impaired computer users", Computer Science vol. 4061, 2006, pp. 1163-1170.*
Pamplona, Vitor Fernando, "Interactive Measurements and Tailored Displays for Optical Aberrations of the Human Eye", Ph. D. Thesis, Jul. 2012.*

* cited by examiner

*Primary Examiner* — Diane Wills
(74) *Attorney, Agent, or Firm* — Baker Botts L.L.P.

(57) ABSTRACT

In one embodiment, a method includes a computing device accessing a deconvolution function for a point spread function describing at least part of a user's eyesight. The computing device applies the deconvolution function to an image to be displayed on a display to the user. The computing device then displays on the display the image as deconvolved.

20 Claims, 4 Drawing Sheets

DEBLURRING IMAGES ACCORDING TO A USER'S EYESIGHT

TECHNICAL FIELD

This disclosure generally relates to image processing.

BACKGROUND

An individual's eyesight determines how the individual views an image. Defects or deficiencies in the individual's eyesight will cause images to appear distorted or degraded relative to how the image appears to an individual who does not have the same defects or deficiencies, or has them to a lesser degree. Eyewear such as eyeglasses or contacts can be a solution for some eyesight deficiencies, but they must be worn to be effective, may be forgotten or lost, and may be uncomfortable. In addition, eyewear offers a fixed correction to an individual's eyesight, meaning that if the individual's eyesight changes over time or changes based on e.g. distance then the utility of any eyewear will be limited to a certain duration or for a certain distance.

SUMMARY OF PARTICULAR EMBODIMENTS

Images electronically displayed, electronically printed on a printing surface, or electronically projected on a projection surface may pre-blurred to correct for defects in a user's vision. A point spread function, including suitable estimations of the point spread function, may be used to describe one or more defects in a user's vision. A deconvolution function corresponding to the user's point spread function may be applied to images to be displayed to the user. The deconvolution function is such that when the deconvolved image is displayed to the user, the image corrects for at least part of the user's vision defects and the user observes the image more clearly. The point spread function, deconvolution function, or both may be estimated by input from a user describing the clarity of various images or the vision defects a user has. Constraints may be placed on the displayed, deconvolved image corresponding to the physical constraints of the electronics providing the image for display or to the medium on which the image is displayed.

DESCRIPTION OF EXAMPLE EMBODIMENTS

Figure 1:
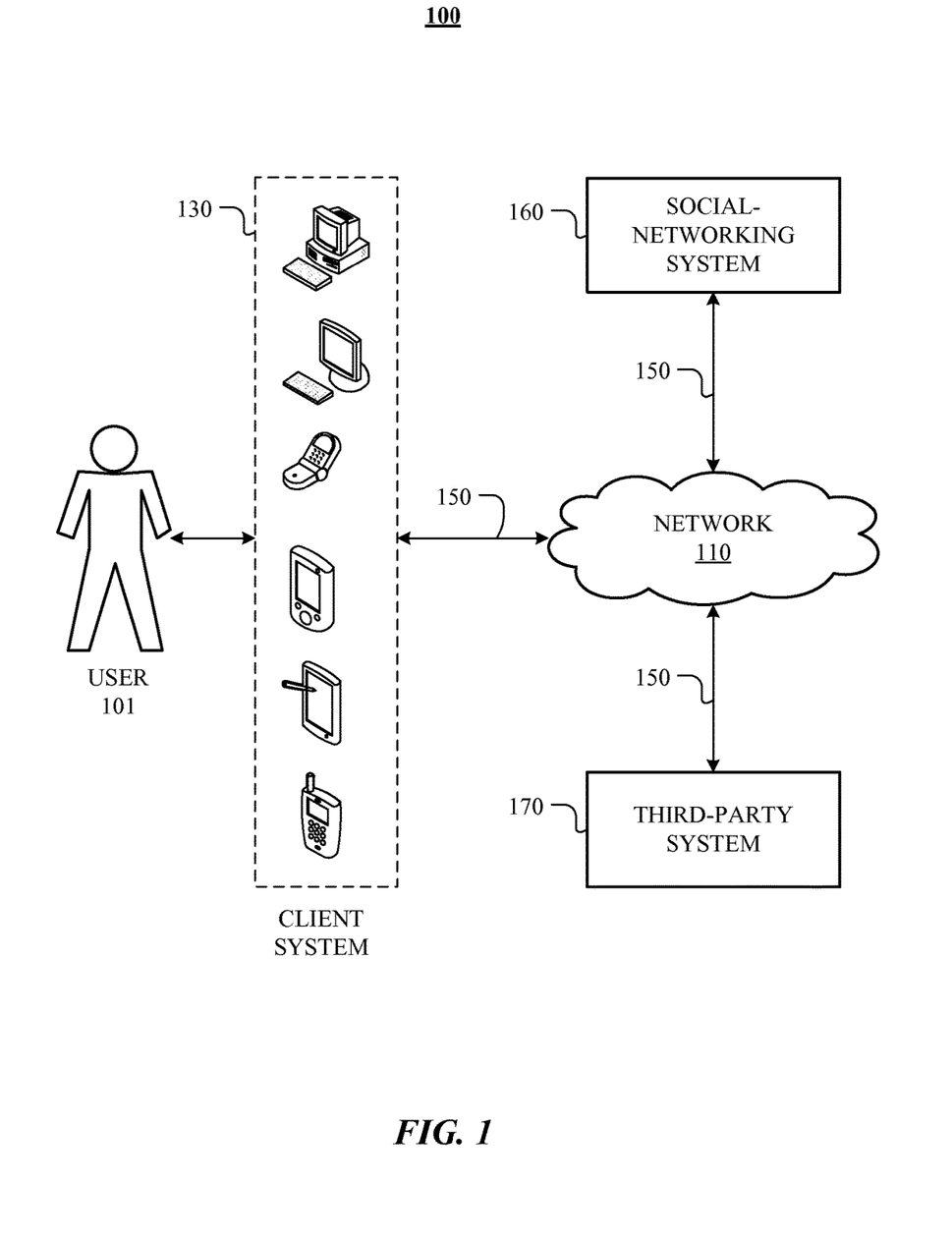
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host software operable to de-blur images for a user. Third-party system 170 may generate, store, receive, and transmit data for de-blurring images for a user such as, for example, a point spread function related to a user or a deconvolution function for de-blurring an image. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
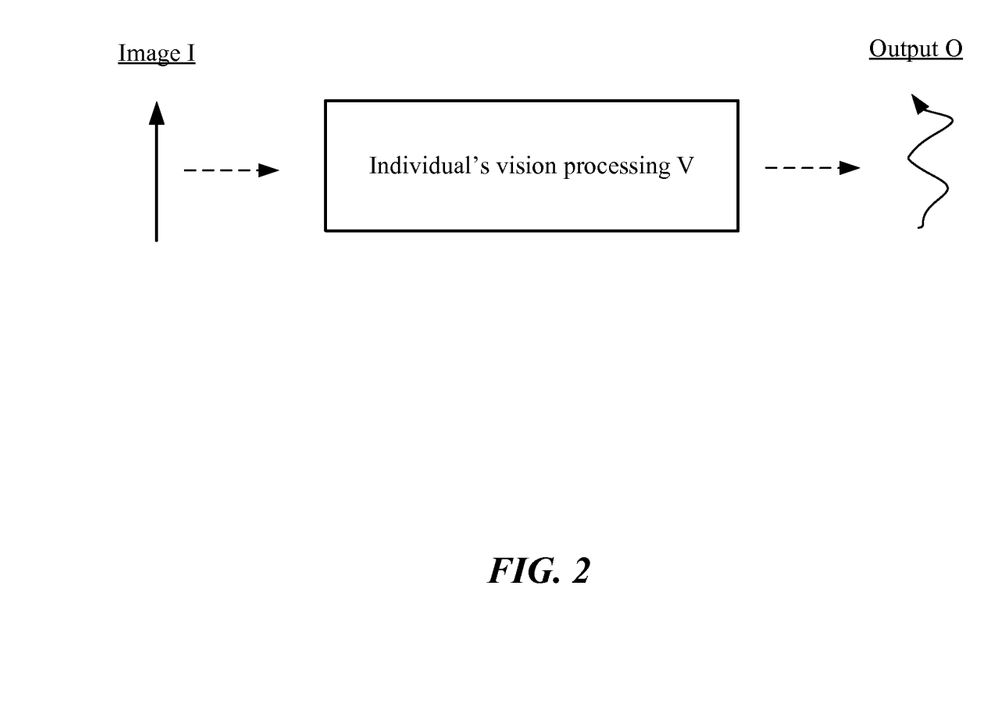
FIG. 2 illustrates the physical effects an individual's vision has on the how an image appears to the individual.

FIG. 2 illustrates the physical effects an individual's vision has on the how an image appears to the individual. Electromagnetic radiation from an image I impinges on an individual's eye. The radiation, primarily in the visible spectrum, from image I is processed by the individual's vision V, resulting in an output O. Output O is the appearance of the image I to the individual after the vision processing V has occurred. Where suitable, as used herein an individual's vision V includes: the physical structures of the individual involved in image processing, such as the individual's eye; any corrective mechanisms apart from the individual's physical structures, such as eyeglasses; or both.

In imaging and image processing, the processing performed by an individual's vision V on the electromagnetic radiation from an image may be described by a mathematical operation known as convolution. Convolution may be represented by any suitable mathematical operation, such as one or more appropriate formulas, one or more approximations to the appropriate formulas (such as numerical approximations), one or more estimations of the mathematical operation by empirical observation, or any suitable combination thereof. For example, one formulaic representation of convolution is $O=I*V$, where the output image O is the convolution of the image I and the user's vision processing V. Formulaic representations of convolution may be made using any suitable mathematical transforms, such as Fourier transforms or Laplace transforms. Numerical approximations to include fast convolution algorithms, such as fast Fourier transforms or the Schonhage-Strassen algorithm. Convolution may be represented by continuous (i.e. involving integration) algorithms, discrete algorithms, circular algorithms, or any other suitable algorithms. The domain of a convolution may restricted to any suitable bounds, for example bounds that enable more efficient calculation or ensure that a convolution exists in the given domain. This disclosure contemplates convolution having any suitable representation, and contemplates convolving as applying, performing, or calculating any suitable representation. As used herein, where suitable convolution includes any of the above representations, approximations, or domain conditions, and any includes any suitable combination thereof.

Deconvolution describes the process of reversing the effects of convolution. For example, using the formulaic description of convolution above, deconvolution results in the output O being the image I by convolving the image with a function D such that $(I*D)*V\_=\_O = I$. Thus, the convolution of a user's vision processing V is accounted for in the initial image display, resulting in the appearance to the individual of the correct image I after the individual's vision processing has occurred. This function D that adjusts (i.e. de-blurs) an image to correct for a user's vision processing, or any function or operation resulting in such correction, is referred to herein as a "deconvolution function". Deconvolution may be calculated, estimated, approximated, or otherwise represented by any suitable method or operation, such as for example formalistic calculations using theoretical formulae, numerical approximations, empirical observations, or any suitable combination thereof. This disclosure contemplates any suitable representations, approximations, or calculations used to accomplish deconvolution or calculated, estimate, or approximate an appropriate deconvolution function.

The effect a user's vision has on how that user views an image may be represented by a point spread function for the user. As user herein, a point spread function for a user includes any suitable representation of the effect or response the user's vision has on an image, such as one or more mathematical formulas, numerical approximations to a formula, a database or table containing data relating to the effects of a user's vision, or any other suitable representation. For example, convolution and deconvolution methods may be used to calculate or approximate a point spread function for a user's vision. In particular embodiments, a point spread function may describe the response a user's vision has to an entire image or any suitable portion of an image. In particular embodiments, a point spread function may describe the response of a user's vision to electromagnetic radiation having one or more frequencies. For example, a point spread function may describe the response of a user's vision to a range of frequencies representing a particular color. Thus, the point spread function may describe one or more chromatic aberrations of the user's vision. In particular embodiments, a point spread function may describe or approximate the response of a user's vision to an idealized point-source image. The response of a user's vision (e.g. the point spread function) may then be used to determine the response of the user's vision to any suitable image made up of point sources, for example by convolving the user's point spread function with the image.

Defects in an individual's vision degrades the appearance of an image relative to an individual who does not have one or more of the same defects or does not have them to the same degree. Defects in an individual's vision include any suitable effect that results in degradation of an image's appearance to the individual, such as for example nearsightedness, farsightedness, astigmatism, chromatic aberration, or any suitable combination thereof. When an image appears on an electronic display, is electronically projected onto a projection surface, or is printed on a printing surface by electronic methods the creation of the image can be controlled and one or more corrections can be made for defects in an individual's vision, resulting in a clearer perception of the image to the individual. As used herein, this process of adjusting an image to correct for a user's vision defects is referred to as "de-blurring" the image, even though the resulting image may appear blurry to an individual who does not have the vision defects accounted for. An electronic display may be associated with any suitable electronic device, such as, for example, a personal computer, a laptop computer, a cellular telephone, a smartphone, or a tablet computer. A printing surface includes any suitable surface on which electronic printing or etching may be done, such as for example printing paper, photography paper, word or metal surfaces, etc. A projection surface includes any suitable surface onto which electronic projection may be done, such as for example a projector screen or other suitable flat surface.

Figure 3:
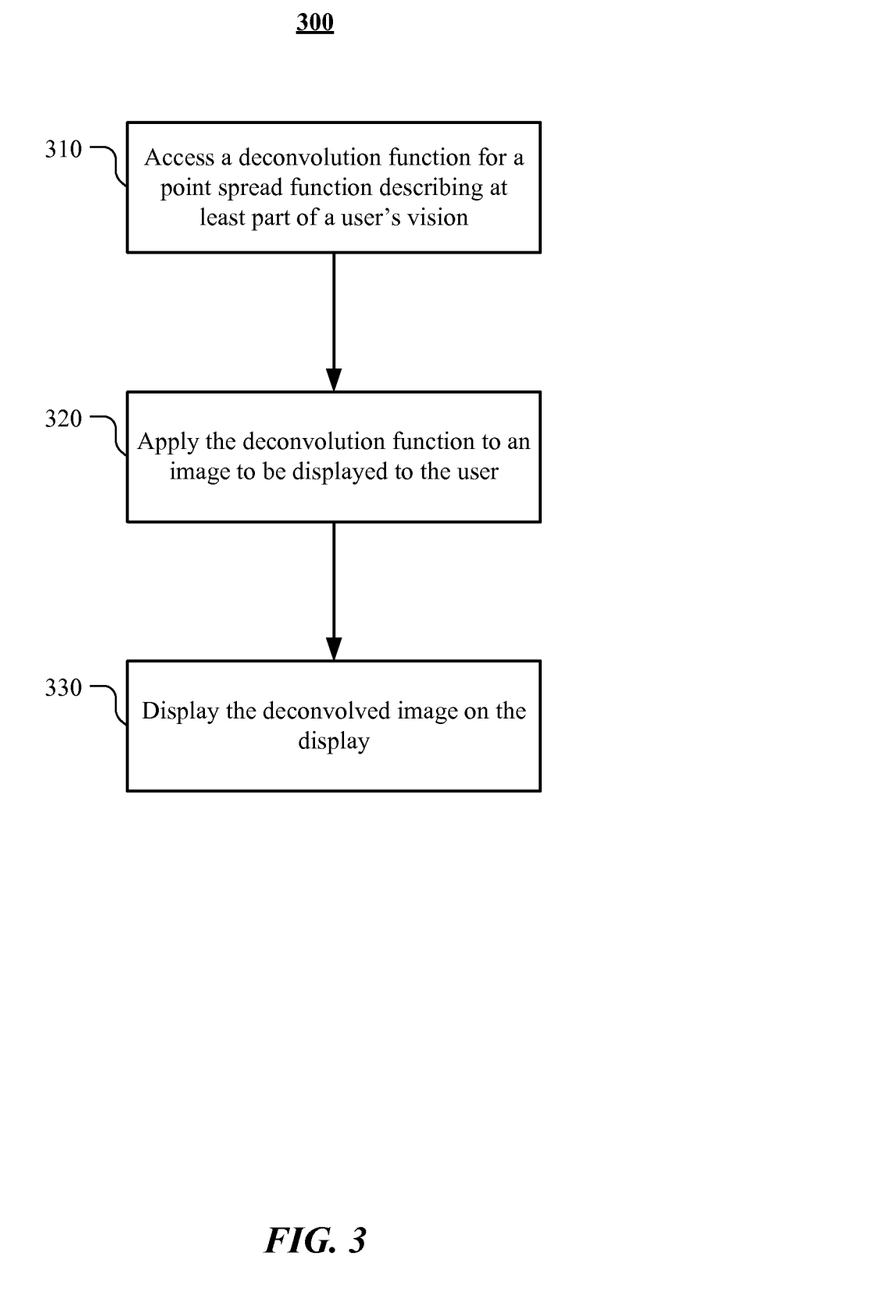
FIG. 3 illustrates an example method for electronically de-blurring an image according to a user's vision defects.

FIG. 3 illustrates an example computer-implement method 300 for electronically "de-blurring" an image. As used herein, an image includes any suitable graphical content electronically displayed, printed, or projected, such as for example text, graphics or graphical elements, movies, pictures, etc. The method may begin at step 310, where a deconvolution function corresponding to a point spread function for a user of the device is accessed. As used herein, a user of a device includes an individual commanding, controlling, accessing, or otherwise making use of a device, even if the user is not directly doing so or the device is controlled by another entity. As used herein, a deconvolution function includes any of the convolution or deconvolution methods and techniques described above, such as formulaic representations, numerical approximations, etc. In particular embodiments, accessing the deconvolution function includes receiving the deconvolution at the computing device performing the method. For example, a deconvolution function may be received from a third-party server or memory elements. In particular embodiments, accessing the deconvolution function includes determining or calculating at least part of the deconvolution function. For example, accessing the deconvolution function may include determining or accessing a point spread function describing a user's vision, and then determining a deconvolution function based on the determined or accessed point spread function. As another example, accessing the deconvolution function may include determining the deconvolution function by empirical means, such as receiving feedback from a user on the clarity of various images which have been de-blurred by a predetermined amount. The de-blurring that results in the clearest image to the user may be selected as the deconvolution function, or the user's point spread function may be estimated from the feedback and a deconvolution function corresponding to the point spread function calculated. The feedback may also be extrapolated to estimate the best deconvolution function, for example by dividing the possible de-blurring results into grid points, iteratively selecting one or more grid points, and calculating or estimating based on the feedback whether the resulting image would be more or less clear to a user. As another example, accessing a deconvolution function may include receiving input from the user about one or more descriptions of the user's vision, such as the user's eyeglasses or contact prescription for nearsightedness or farsightedness in diopters. In addition or the alternative, input may describe a user's astigmatism, chromatic aberration, or any other suitable vision defect. A deconvolution function corresponding to predetermined de-blurring for the provided input or close to the provided input may then be selected. While this disclosure describes specific examples of accessing a deconvolution function, this disclosure contemplates any suitable method or way of accessing a deconvolution function.

At step 320, a computing device applies the deconvolution function accessed in step 310 to an image that is to be displayed to a user. This disclosure contemplates any suitable methods for applying the deconvolution function to the image. For example, the deconvolution function or a related function may be applied to the image by convolving the function with the pre-blurred image. As another example, a suitable description representing the results or effects of the deconvolution function (e.g. to brighten or darken particular pixels) may be applied to the image. In particular embodiments, constraints (discussed more fully, below) on the resulting de-blurred image may be applied during step 320. For example, one or more pre-determined constraints may be applied to the deconvolution function (such as, for example, the domain in which the deconvolution function applies or the range of results that application of a deconvolution function can have) rather than to a de-blurred image.

At step 330, the de-blurred image of step 320 is displayed on a display for a user to view. As discussed above, a display includes electronic displays, printing surfaces, and projection surfaces. In particular embodiments, the type of display on which the image is to be displayed, or the electronics generating the displayed image, may have one or more constraints that restrict how a de-blurred image may be displayed. For example, a deconvolution function may de-blur an image by specifying the brightness or intensity of one or more pixels in or around an image. The physical parameters of the display, such as the maximum or minimum intensity of the display, limit the ranges of brightness or intensity that may be displayed. In this example, these constraints may be accounted for by limiting the values of pixels in a computed, de-blurred image to specific values or ranges of values, bounded by the constraints above. As another example, the background brightness may be increased so that the image can have darker pixel values relative to the background. In general, constraints may be accounted for using any suitable method. For example, any value outside of the constraint may be given the closest value within the constraint. As another example, all values may be scaled such that the total range of values falls within the constraints. This scaling may occur linearly or using any suitable non-linear function. This disclosure contemplates any suitable method of accounting for constraints when displaying a de-blurred image to an individual.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
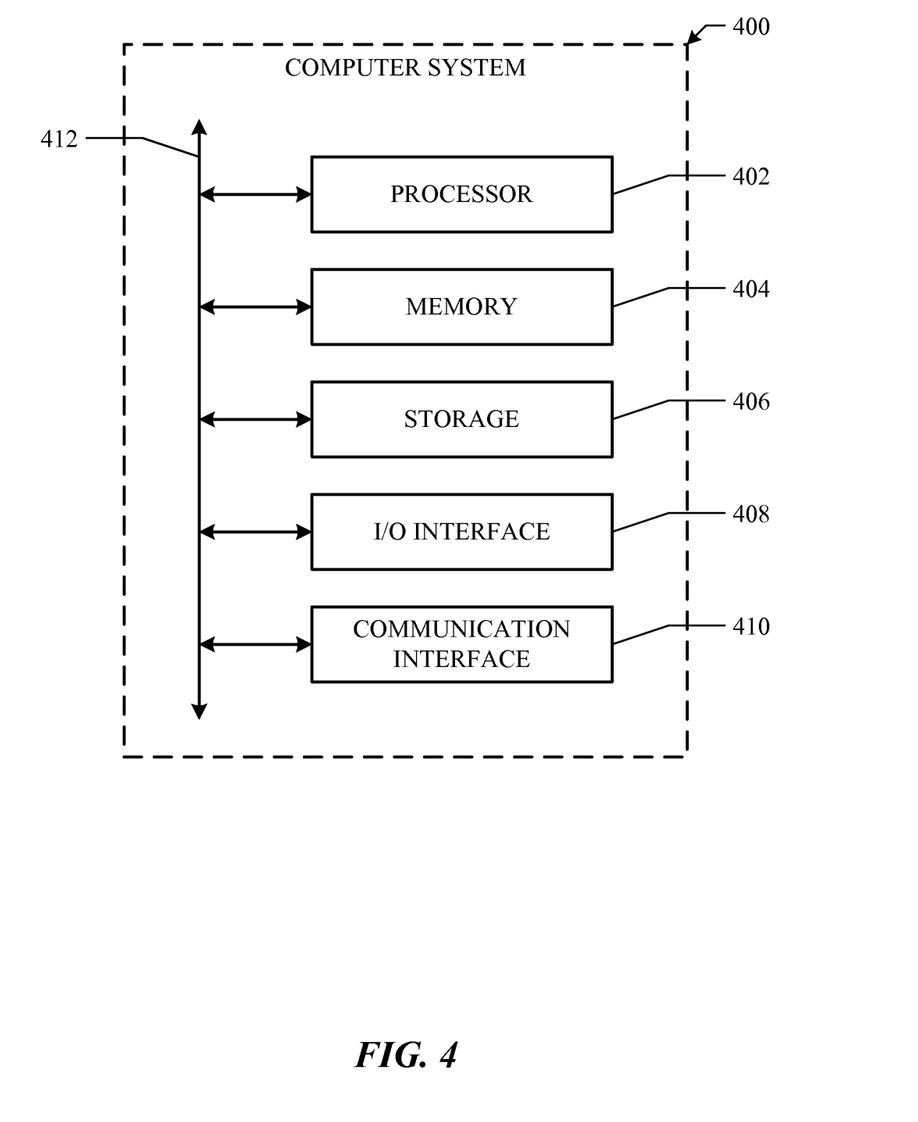
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device associated with a user, accessing a deconvolution function for a point spread function describing at least part of the user's eyesight;
   by the computing device, applying the deconvolution function to an image to be displayed on a display to the user, the application of the deconvolution function de-blurring the image by specifying a brightness of:
   one or more pixels of the image; and
   one or more pixels near the image; and
   by the computing device, displaying on the display the image and the one or more pixels near the image as deconvolved.

2. The method of claim 1, wherein accessing the deconvolution function comprises determining the deconvolution function.

3. The method of claim 1, wherein accessing the deconvolution function comprises receiving information describing the deconvolution function.

4. The method of claim 1, wherein accessing the deconvolution function for the point spread function describing at least part of the user's eyesight comprises:
   displaying one or more images to the user;

receiving feedback from the user on the clarity of at least one of the one or more images;

determining the point spread function for the user based on the received feedback; and determining the deconvolution function for the determined point spread function.

5. The method of claim 1, wherein accessing the deconvolution function for the point spread function describing at least part of the user's eyesight comprises:

receiving information describing one or more attributes of the user's vision;

determining the point spread function for the user based on the received information; and determining the deconvolution function for the determined point spread function.

6. The method of claim 1, wherein the point spread function of the user comprises information about one or more chromatic aberrations of the user's vision.

7. The method of claim 1, wherein the point spread function of the user comprises information about one or more of the user's nearsightedness or farsightedness.

8. The method of claim 1, wherein the point spread function of the user comprises information about the user's astigmatism.

9. The method of claim 1, wherein the display is a display of a device.

10. The method of claim 1, wherein displaying on the display the image as deconvolved comprises one or more of:

printing the image on a printing surface; or projecting the image on a projection surface.

11. The method of claim 1, wherein the image comprises text.

12. The method of claim 1, wherein the image comprises non-text graphics.

13. The method of claim 1, wherein the image comprises video.

14. The method of claim 1, wherein specifying a brightness of the one or more pixels of the image or the one or more pixels near the image comprises applying one or more constraints to the domain in which the deconvolution function is applied.

15. One or more computer-readable non-transitory storage media embodying software that is operable when executed to:

access a deconvolution function for a point spread function describing at least part of the user's eyesight;

apply the deconvolution function to an image to be displayed on a display to the user, the application of the deconvolution function de-blurring the image by specifying a brightness of:

one or more pixels of the image; and one or more pixels near the image; and display on the display the image and the one or more pixels near the image as deconvolved.

16. The media of claim 15, wherein the software is further operable when executed to determine the deconvolution function.

17. The media of claim 15, wherein the software is further operable when executed to receive information describing the deconvolution function.

18. The media of claim 15, wherein the software is further operable when executed to:

display one or more images to the user;

receive feedback from the user on the clarity of at least one of the one or more images;

determine a point spread function for the user based on the received feedback; and determine the deconvolution function for the determined point spread function.

19. The media of claim 15, wherein the software is further operable when executed to:

receive information describing one or more attributes of the user's vision;

determine the point spread function for the user based on the received information; and determine the deconvolution function for the determined point spread function.

20. A system comprising:

one or more processors; and a memory coupled to the processors comprising instructions executable by the processors, the processors being operable when executing the instructions to:

access a deconvolution function for a point spread function describing at least part of the user's eyesight;

apply the deconvolution function to an image to be displayed on a display to the user, the application of the deconvolution function de-blurring the image by specifying a brightness of:

one or more pixels of the image; and one or more pixels near the image; and display on the display the image and the one or more pixels near the image as deconvolved.

* * * * *